(12) United States Patent
Choi et al.

(10) Patent No.: US 7,372,786 B2
(45) Date of Patent: May 13, 2008

(54) OPTICAL PICKUP ACTUATOR

(75) Inventors: In Ho Choi, Anyang-si (KR); Kwan Woo Park, Seoul (KR); Gina Kim, Namyangju-si (KR); Seong Hun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 11/007,540

(22) Filed: Dec. 7, 2004

(65) Prior Publication Data

US 2005/0122855 A1  Jun. 9, 2005

(30) Foreign Application Priority Data

Dec. 8, 2003 (KR) .................. 10-2003-0088556

(51) Int. Cl.
*G11B 7/00* (2006.01)

(52) U.S. Cl. ............... 369/44.22; 369/112.24

(58) Field of Classification Search .............. None
See application file for complete search history.

(56) References Cited

U.S. PATENT DOCUMENTS

| 5,864,524 | A |   | 1/1999 | Sakaguchi |
|---|---|---|---|---|
| 6,031,812 | A | * | 2/2000 | Liou ..................... 720/683 |
| 2005/0122855 | A1 | * | 6/2005 | Choi et al. ............ 369/44.15 |

FOREIGN PATENT DOCUMENTS

| EP | 0 773 537 | 5/1997 |
|---|---|---|
| EP | 0 773 538 | 5/1997 |
| EP | 09190638 | 7/1997 |
| EP | 0 773 538 | 3/1998 |
| EP | 0 838 809 | 4/1998 |
| EP | 10198969 | 7/1998 |
| EP | 0 773 537 | 2/1999 |
| EP | 11175996 | 7/1999 |
| JP | 09-190638 | 7/1997 |
| JP | 9288828 | 11/1997 |
| JP | 10-198969 | 7/1998 |
| JP | 11-175996 | 7/1999 |
| KR | 2001-0112774 | 12/2001 |

\* cited by examiner

*Primary Examiner*—Paul W. Huber
(74) *Attorney, Agent, or Firm*—Lee, Hong, Degerman, Kang & Schmadeka (57) ABSTRACT

The present invention provides an optical pickup actuator, in which a pair of lenses, e.g., BD lens and DVD lens, are loaded on one pickup to record/reproduce information on/from optical discs having various write capacities such as BD (Blu-ray disc), CD, DVD and the like, by which drive and system configurations can be simplified, and by which the facilitation of the system configuration and high sensitivity of the actuator are provided since there exist no sensitivity deviations of tracking and focusing between BD and CD or DVD actuators.

19 Claims, 9 Drawing Sheets

OPTICAL PICKUP ACTUATOR

This application claims the benefit of the Korean Application No. P2003-088556 filed on Dec. 8, 2003, which is hereby incorporated by reference.

BACKGROUND OF THE INVENTION

1. Field of the Invention

The present invention relates to an optical pickup actuator, in which a pair of lenses, e.g., BD lens and DVD lens, are loaded on one pickup to record/reproduce information on/from optical discs having various write capacities such as BD (Blu-ray disc), CD, DVD and the like, by which drive and system configurations can be simplified, and by which the facilitation of the system configuration and high sensitivity of the actuator are provided since there exist no sensitivity deviations of tracking and focusing between BD and CD/DVD actuators.

2. Discussion of the Related Art

Currently, DVD (digital versatile disc) having a single-side recording capacity of 4.7 GB and 0.74 μm track pitch is on the market as an optical information storage disc of a large capacity. Yet, in case of writing about 135-minute HD (high definition) moving picture information on DVD, at least 23 GB recording capacity is needed.

In order to write such a large volume of data, a blue purple light source having a wavelength shorter than that of a previous red light source has been provided to develop the Blu-ray disc (hereinafter abbreviated BD) on which information can be recorded and reproduced using the blue purple light source.

Meanwhile, in order to raise a numerical aperture (NA) of an objective lens, a high-NA lens should be used.

Since BD uses a high-NA lens designed to have a focus fitted on a recording surface of 0.1 mm thickness, there exists compatibility problem in using the BD lens for another optical disc such as CD, DVD, or the like, which has a recording surface thickness different from that of BD.

Namely, spherical aberration (SA) generated from a distance variation between recording surfaces, coma aberration (CA) generated from a tilt of an optical disc (e.g., surface vibration, etc.), astigmatism (AS) by defocus, and the like bring about degradation of optical characteristics.

Moreover, the lens for CD or DVD is also needed in addition to the lens for BD for securing compatibility with various kinds of optical discs due to such a problem as the difference of optical power (write power) and the like.

For such reasons, a pair of optical pickups are loaded on one drive in a manner of configuring separately the DVD or CD optical pickup and the BD optical pickup.

However, the above-configured drive fails to avoid the increase of its overall configuration size as well as product cost.

SUMMARY OF THE INVENTION

Accordingly, the present invention is directed to an optical pickup actuator that substantially obviates one or more problems due to limitations and disadvantages of the related art.

An object of the present invention is to provide an optical pickup actuator, in which a pair of lenses, e.g., BD lens and DVD lens, are loaded on one pickup to record/reproduce information on/from optical discs having various write capacities such as BD (Blu-ray disc), CD, DVD and the like, by which drive and system configurations can be simplified, and by which the facilitation of the system configuration and high sensitivity of the actuator are provided since there exit no sensitivity deviations of tracking and focusing between BD and CD/DVD actuators.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical pickup actuator according to the present invention comprises a yoke comprising a plate member and four magnet guides protruding from a lateral side of the plate member in a direction vertical to a topside of the plate member and configuring two confronting pairs with each magnet guide left a prescribed distance from adjacent magnetic guides, first to fourth magnets adhering closely to insides of the magnet guides, respectively to provide an inside space on the plate member of the yoke, a shaft protruding from the plate member of the yoke within the inside space surrounded by the first to fourth magnets, a lens holder loaded on the plate member of the yoke within the inside space surrounded by the first to fourth magnets to have the shaft inserted therein and to have first and second disc lenses provided thereon, iron piece guides protruding from a lateral side of the lens holder to confront the first to fourth magnets and to have recesses inside, respectively, first to fourth iron pieces fitted in the recesses of the iron piece guides, respectively, and coils wound on outsides of the iron piece guides, respectively.

In another aspect of the present invention, an optical pickup actuator comprises a first and third magnets confronting to leave a prescribed distance from each other wherein each of the first and third magnets is divided into right and left parts differing from each other in polarity, a second and fourth magnets confronting to leave a prescribed distance from each other on a line crossing with a connecting line between the first and third magnets wherein each of the second and fourth magnets is divided into upper and lower parts differing from each other in polarity, a pair of first conductive coils provided to an inside area of a closed curve line sequentially connecting the first to fourth magnets to separately lie on the connecting line between the first and third magnets, a pair of the first conductive coils wound on iron pieces, respectively, a pair of second conductive coils provided to the inside area of the closed curve line sequentially connecting the first to fourth magnets to separately lie on a connecting line between the second and fourth magnets, a pair of the second conductive coils wound on iron pieces, respectively, and a lens holder having a first and second disc lenses loaded thereon wherein the first and second conductive coils are provided to the lens holder.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
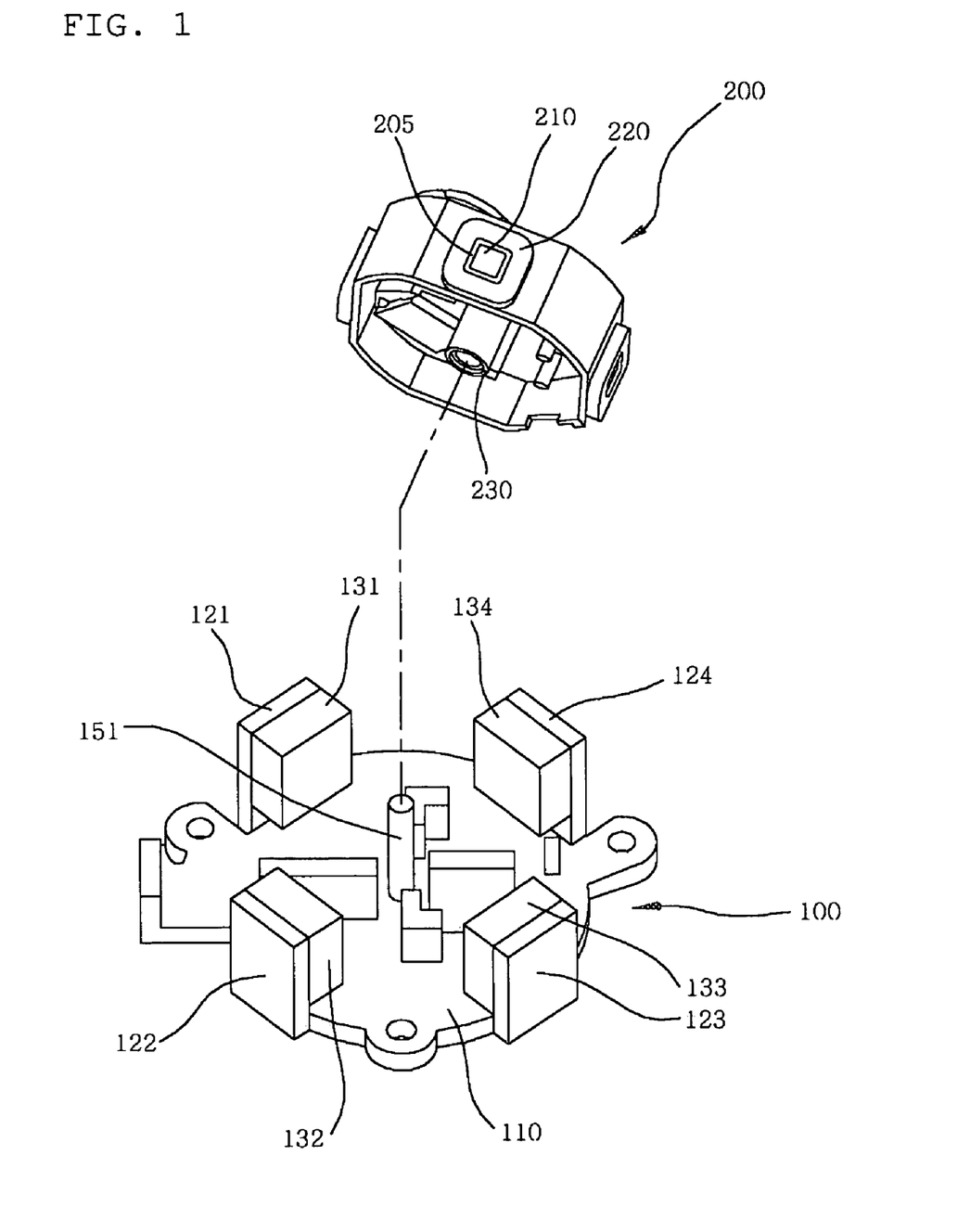
FIG. 1 is a projected perspective diagram of an optical pickup actuator according to the present invention.

FIG. 1 is a projected perspective diagram of an optical pickup actuator according to the present invention.

Referring to FIG. 1, an optical pickup actuator according to the present invention comprises a yoke 100 comprising a plate member 110 and four magnet guides 121 to 124 protruding from a lateral side of the plate member 110 in a direction vertical to a topside of the plate member 110 and configuring two confronting pairs with each magnet guide left a prescribed distance from adjacent magnetic guides, first to fourth magnets 131 to 134 adhering closely to insides of the magnet guides 121 to 124, respectively to provide an inside space on the plate member 110 of the yoke 100, a shaft 151 protruding from the plate member 110 of the yoke 100 within the inside space surrounded by the first to fourth magnets 131 to 134, a lens holder 200 loaded on the plate member 110 of the yoke 100 within the inside space surrounded by the first to fourth magnets 131 to 134 to have the shaft 151 inserted therein and to have DVD and BD lenses provided thereon, iron piece guides 205 protruding from a lateral side of the lens holder 200 to confront the first to fourth magnets 131 to 134 and to have recesses inside, respectively, first to fourth iron pieces 210 fitted in the recesses of the iron piece guides 205, respectively, and coils wound on outsides of the iron piece guides 205, respectively.

Namely, first and second disc lenses are loaded on the lens holder 200. Each of the first and second lenses is to be selected from the group consisting of CD lens, DVD lens, CD/DVD lens, and BD lens. Alternatively, each of the first and second lenses is to be selected from the group consisting of blue light source lens, blue purple light source lens, and red light source lens.

A shaft guide 230 having a perforated hole inside is provided within the lens holder 200 so that the shaft 151 can be inserted therein. Hence, the shaft 151 is inserted in the perforated hole of the shaft guide 230 so that the lens holder 200, as shown in FIG. 2, can be assembled to the yoke 100.

Preferably, each of the iron guides 205 has a rectangular shape having a recess inside or a '⌐' shape having one side open.

Figure 2:
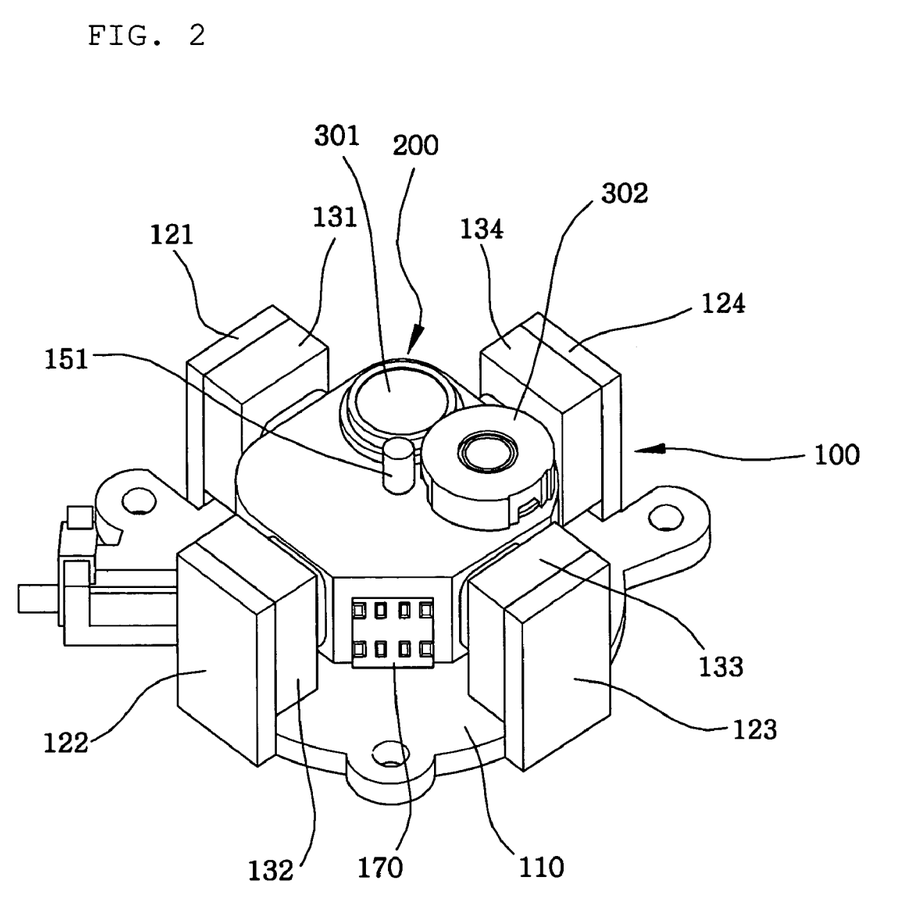
FIG. 2 is a perspective diagram of an optical pickup actuator according to the present invention.

And, a reference number '170' in FIG. 2 indicates a printed circuit board (PCB) connected to the coils.

Moreover, the magnet guides 121 and 123 confront each other to configure one pair, while the rest magnet guides 122 and 124 confront each other to configure the other pair. Hence, there are two pairs of the magnet guides 121 to 124.

Figure 3:
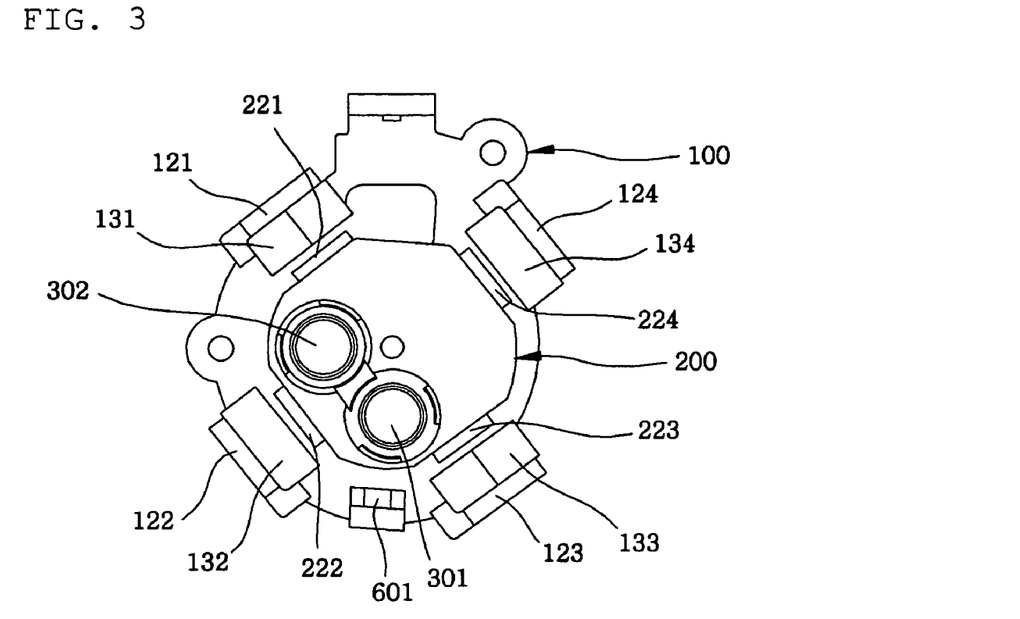
FIG. 3 is a diagram of an optical pickup actuator according to the present invention for explaining tracking and focusing operations of reproducing/writing information from/on CD or DVD.

FIG. 3 is a diagram of an optical pickup actuator according to the present invention for explaining tracking and focusing operations of reproducing/writing information from/on CD or DVD. Referring to FIG. 3, the first and third magnets 131 and 133, each of which is divided into right and left parts to differ from each other in polarity, are provided to the yoke 100. And, the second and fourth magnets 132 and 134, each of which is divided into upper and lower parts to differ from each other in polarity, are provided to the yoke 100 as well.

The coils 221 and 223 wound on the first and third iron pieces of the lens holder 200 are placed to confront the first and third magnets 131 and 133, respectively. And, the rest coils 222 and 224 wound on the second and fourth iron pieces of the lens holder 200 are placed to confront the second and fourth magnets 132 and 134, respectively.

In performing a tracking operation on CD or DVD with the above-configured optical pickup actuator, a positive voltage is applied to the coil 223 wound on the third iron piece and a negative voltage is applied to the coil 221 wound on the first iron piece. Hence, the CD or DVD lens tracks in a direction of an inner circumference of a disc.

On the contrary, in case that a negative voltage is applied to the coil 223 wound on the third iron piece and a positive voltage is applied to the coil 221 wound on the first iron piece, the CD or DVD lens tracks in a direction of an outer circumference of a disc.

In performing a focusing operation, a positive voltage is applied to the coil 224 wound on the fourth iron piece and a negative voltage is applied to the coil 222 wound on the second iron piece. Hence, the CD or DVD lens is raised to get closer to the disc.

On the other hand, in case that a negative voltage is applied to the coil 224 wound on the fourth iron piece and a positive voltage is applied to the coil 222 wound on the second iron piece, the CD or DVD lens is lowered to get farther from the disc.

Figure 4:
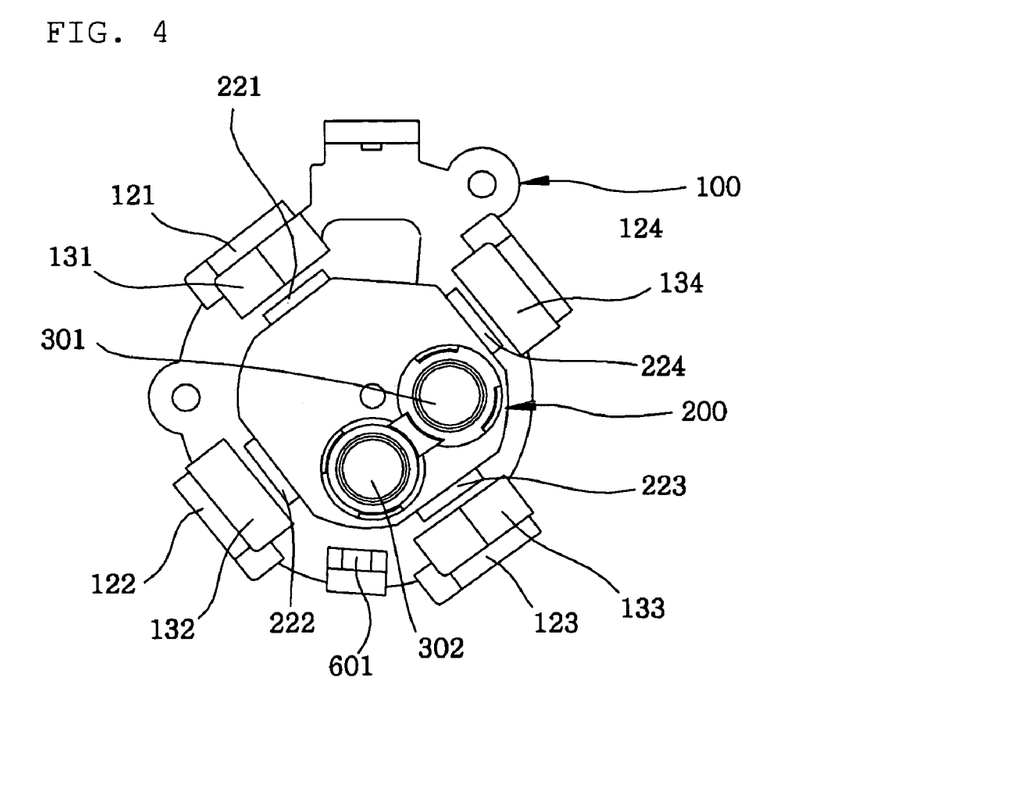
FIG. 4 is a diagram of an optical pickup actuator according to the present invention for explaining tracking and focusing operations of reproducing/writing information from/on BD.

FIG. 4 is a diagram of an optical pickup actuator according to the present invention for explaining tracking and focusing operations of reproducing/writing information from/on BD.

Referring to FIG. 4, the lens holder 200 is rotated by 90° centering on the shaft.

In doing so, the coils 221 and 223 wound on the first and third iron pieces used in the CD or DVD tracking are used as BD focusing coils, respectively, by 90° rotation of the lens holder 200, while the rest coils 222 and 224 wound on the second and fourth iron pieces used in the CD or DVD focusing are used as BD tracking coils, respectively, by 90° rotation of the lens holder 200.

In this case, the BD tracking/focusing is carried out in the same manner as the CD or DVD tracking/focusing.

By rotating the lens holder 200 by 90° to carry out the tracking or focusing with the same coils in switching the CD/DVD or BD lens to the BD or CD/DVD lens, the present invention makes it possible to utilize two lenses in one lens holder.

Namely, since the configurations of the same coils and iron pieces are used, it is unnecessary to separate the CD/DVD and BD lenses from each other for the corresponding configuration. Hence, the present invention reduces the overall weight to enhance sensitivity. And, since the iron pieces are assembled to the outer lateral side of the lens holder, the present invention enhances assembly efficiency as well as reduces assembly deviation.

Figure 5A:
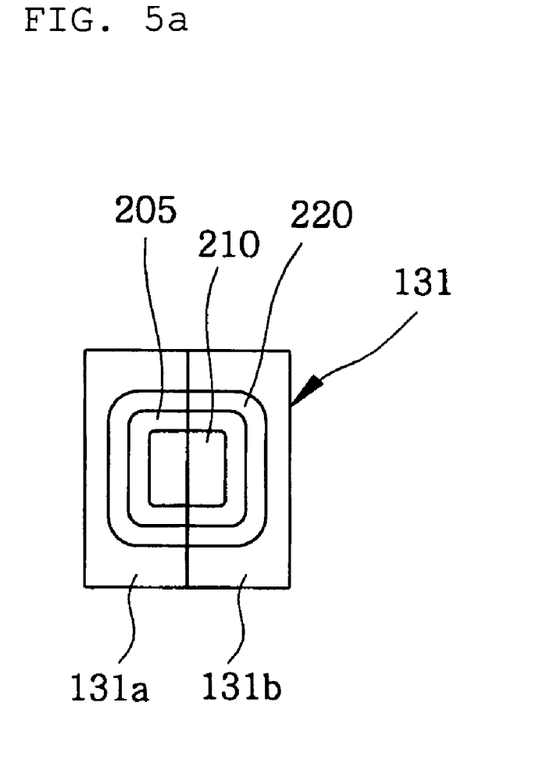
FIG. 5A and FIG. 5B are diagrams of an optical pickup actuator according to the present invention, in which a coil and iron piece confront a magnet in tracking or focusing.
Figure 5B:
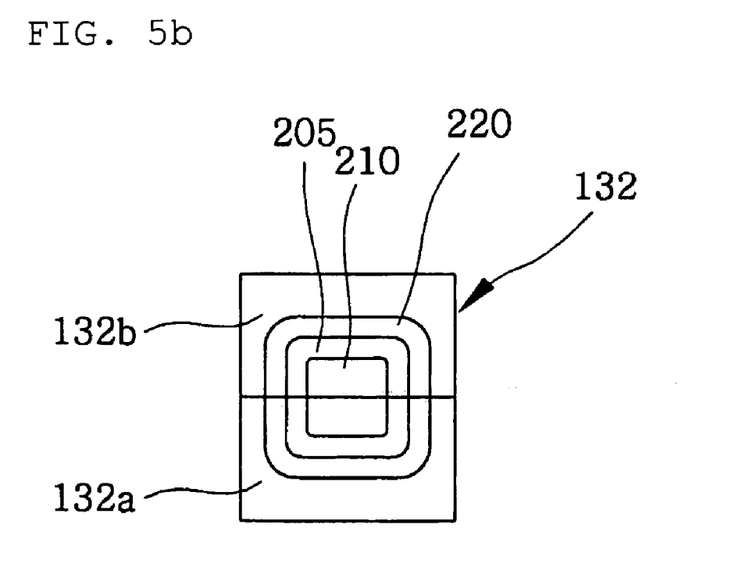

FIG. 5A and FIG. 5B are diagrams of an optical pickup actuator according to the present invention, in which a coil and iron piece confront a magnet in tracking or focusing each.

Referring to FIG. 5A and FIG. 5B, the magnets and the iron pieces used in the optical pickup actuator of the present invention are uniform in size, thereby reducing the deviation in switching. When the iron pieces 210 is placed to confront the magnet 131 for tracking or focusing, a symmetric center line of the iron piece 210 coincides with an area having the greatest magnetic forces of other magnets differing in polarity each, i.e., a separated line (magnetic gap) according to a force stabilizing the iron piece 210 toward the area having the greatest magnetic forces of the magnets 131a/131b and 132a/132b differing in polarity each.

Even if the lens is rotated by 90° for lens switching, an initial position is maintained before and after the switching not to vary a magnetic spring constant value. Hence, the magnets, coils, and iron pieces can be maintained stable not to bring about the sensitivity deviations of tracking and focusing, whereby high sensitivity is realized and the corresponding manufacturing and assembly are facilitated.

Figure 6A:
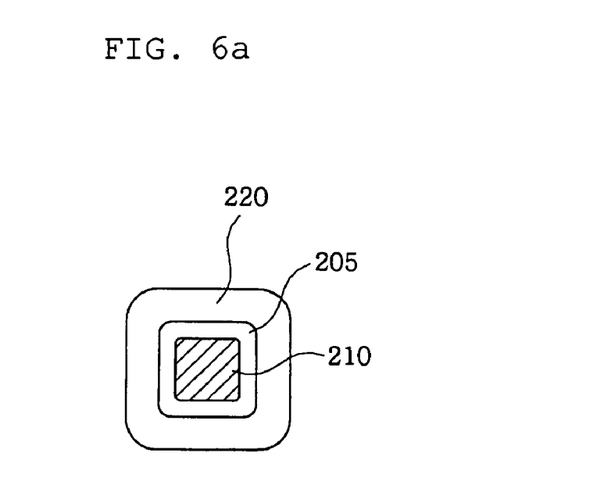
FIGS. 6A to 6C are diagrams of an iron piece according to the present invention.
Figure 6B:
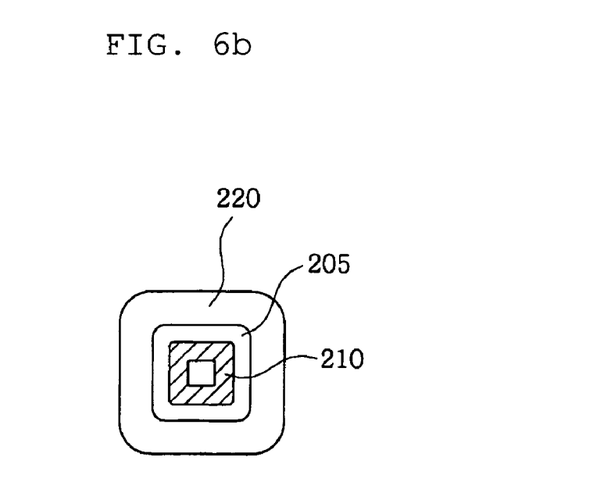
Figure 6C:
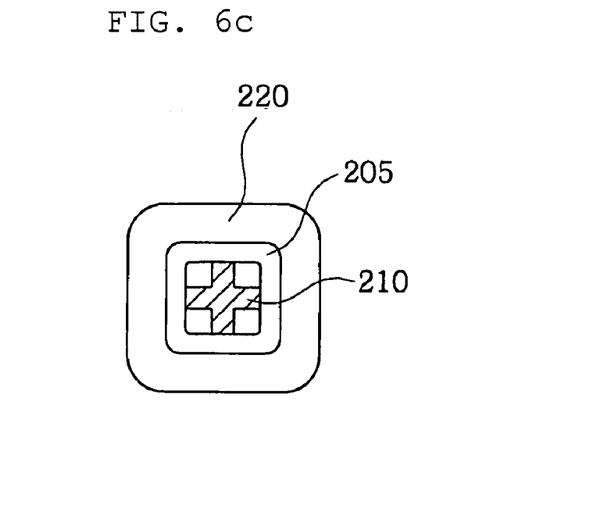

FIGS. 6A to 6C are diagrams of an iron piece according to the present invention.

The iron pieces can be variously shaped according to the spring constant value needed by a system. For example, the iron piece, as shown in FIG. 6A, is rectangular. The iron piece, as shown in FIG. 6B, has a rectangular shape having an open inside. And, the iron piece, as shown in FIG. 6C, has a cross shape.

Figure 7:
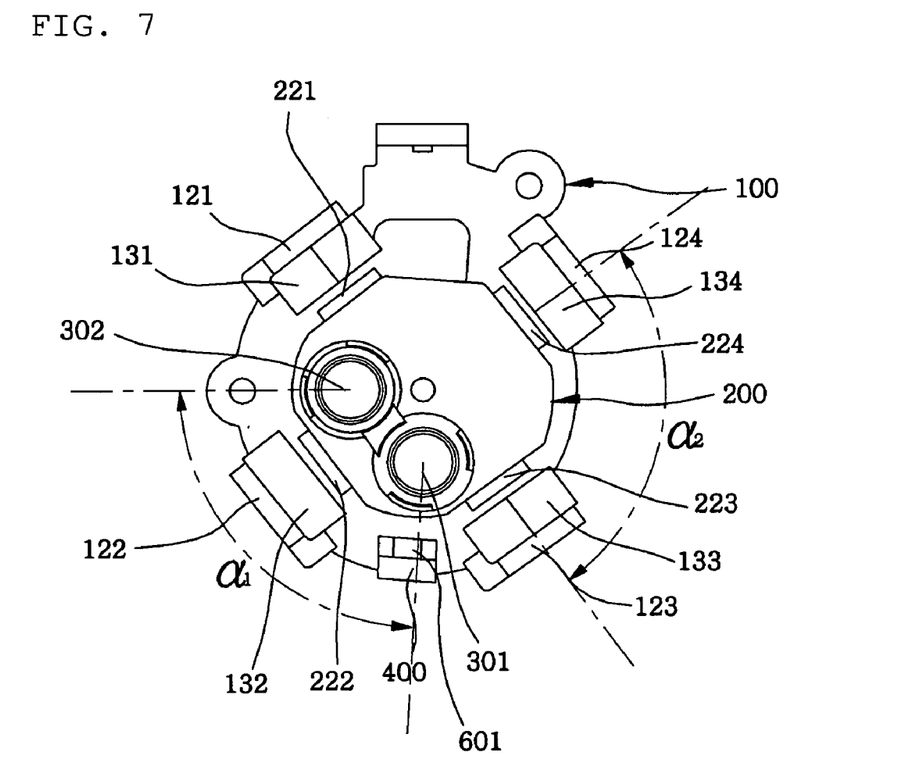
FIG. 7 is a diagram of an optical pickup actuator according to the present invention for explaining a switching principle of a lens.

FIG. 7 is a diagram of an optical pickup actuator according to the present invention for explaining a switching principle of a lens.

Referring to FIG. 7, in changing CD/DVD disc to BD disc to use, a BD lens 302 is rotated by 90° to be moved to a position where the CD or DVD lens 301 used to be placed.

In switching the corresponding lens, if power in a tracking direction is instantaneously applied in a direction of switching a lens to be cut off, a rotation moment is raised to overcome a magnetic spring restoring force generated between the iron piece and the magnet and to rotate the corresponding lens.

Thereafter, the rotation moment is lowered not to overcome a next magnetic spring force and then resides on a magnetic force stabilized point. Thus, the lens is switched.

For this, a switching angle α1 between the CD/DVD lens 301 and the BD lens 302 should be equal to an angle α2 between two neighboring iron pieces or magnets. In the present invention, the angle is determined as 90°.

Figure 8:
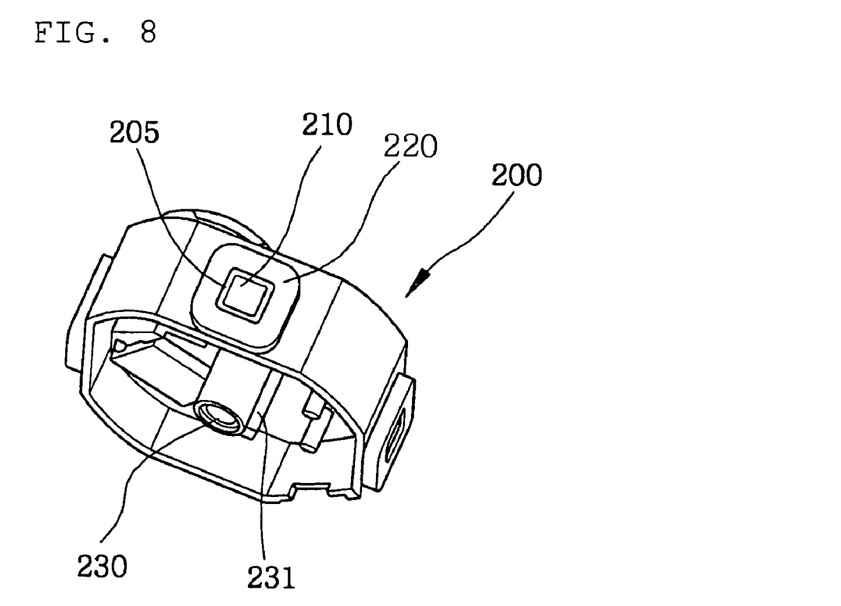
FIG. 8 is a perspective diagram of a rotation blocking rod used in lens switching according to the present invention.

FIG. 8 is a perspective diagram of a rotation blocking rod used in lens switching according to the present invention.

Figure 9:
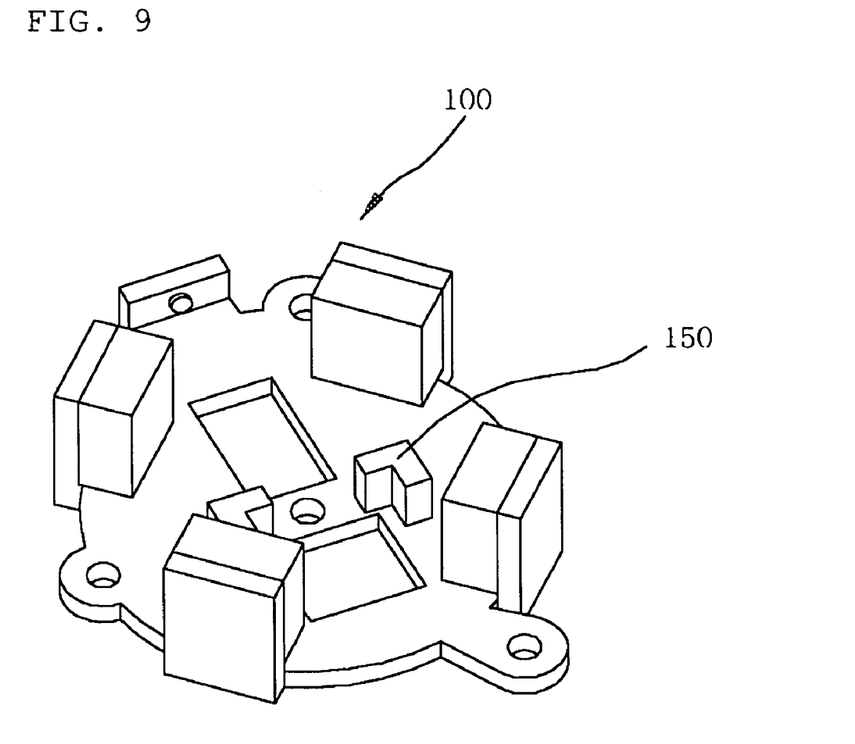
FIG. 9 is a perspective diagram of a rotation preventing block used in lens switching according to the present invention.

Referring to FIG. 8, in order for the lens holder 200 not to rotate over 90° for lens switching, a blocking rod 231 is provided to a lateral side of the lens holder shaft guide 230 having the perforated hole in which the shaft of the yoke is inserted. And, a rotation preventing block 150, as shown in FIG. 9, is provided to the yoke 100 to prevent the blocking rod 231 from being rotated over 90°.

Hence, the blocking rod 231 and the rotation preventing block 150 are able to prevent the lens from being rotated over 90°.

Figure 10A:
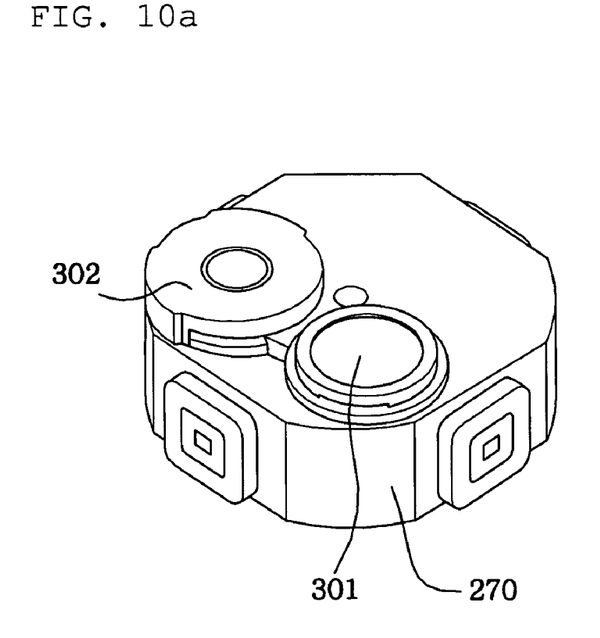
FIG. 10A and FIG. 10B are perspective diagrams of a sidewall of a lens holder for sensing positions of CD or DVD lens and BD lens according to the present invention.
Figure 10B:
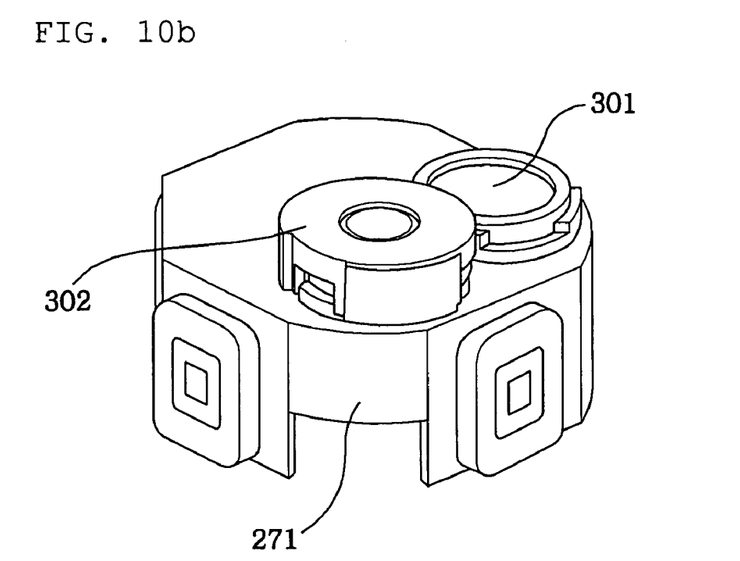

FIG. 10A and FIG. 10B are perspective diagrams of a sidewall of a lens holder for sensing positions of CD or DVD lens and BD lens according to the present invention.

Referring to FIG. 10A, a sidewall 270 of the lens holder in the vicinity of the CD or DVD lens 301 is fully closed to recognize that the CD or DVD lens 301 is located at the position for performing reproduction and recording.

Referring to FIG. 10B, a sidewall 270 of the lens holder in the vicinity of the BD lens 302 is partially open to recognize that the BD lens 302 is located at the position for performing reproduction and recording.

Thus, if the sidewalls of the lens holder are configured to be fully closed and partially open, respectively, by the difference of current flowing into a position deciding sensor (indicated by a reference number 601 in FIG. 3, FIG. 4, or FIG. 7) it is possible to recognize the position of the CD/DVD lens 301 or the BD lens 302.

Assuming that a state of the fully closed sidewall of the lens holder is a state for performing the reproducing and recording of the CD/DVD lens 301 and that a state of the partially open sidewall of the lens holder is a state for performing the reproducing and recording of the BD lens 302, the operation is explained in detail with reference to FIG. 13 as follows.

Figure 13:
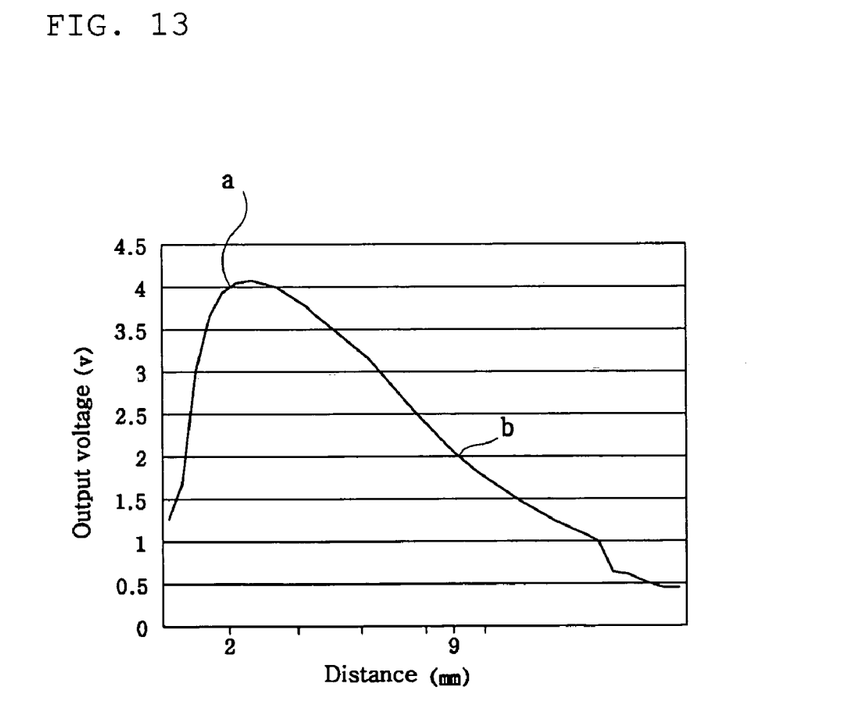
FIG. 13 is a graph to figure out switched positions of CD or DVD lens and BD lens according to the present invention.

First of all, in view of a distance corresponding to a path along which a light emitted from the position deciding sensor such as a photo-coupler travels to be reflected to return, a distance of the partially open sidewall state 'b' of the lens holder is longer than that of the fully closed sidewall state 'a' of the lens holder as shown in FIG. 13.

Hence, 'a' in FIG. 13 represents the case that the sidewall of the lens holder is fully closed, in which an output voltage corresponding to the distance of the light traveling to return measures 4V in case of the distance 2 mm.

And, 'b' in FIG. 13 represents the case that the sidewall of the lens holder is partially open, in which an output voltage corresponding to the distance of the light traveling to return measures 2V in case of the distance 9 mm.

Consequently, it is possible to strictly distinguish the switching states from each other by the difference between the output voltages, whereby the state of the CD/DVD lens 301 or the BD lens 302 on which the reproducing and recording will be performed can be precisely figured out.

Figure 11:
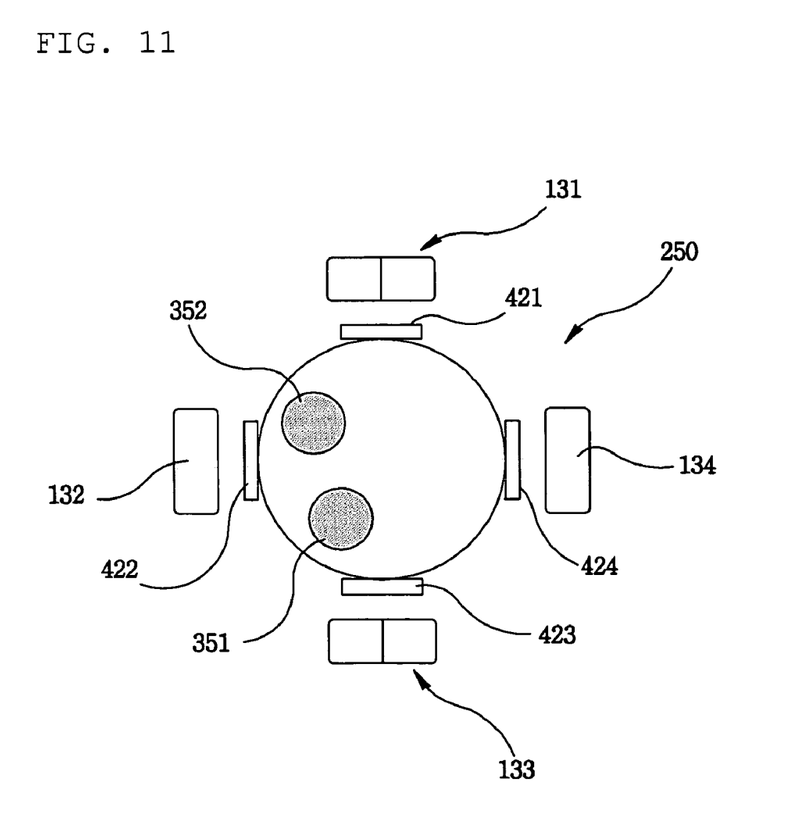
FIG. 11 is a schematic layout of a basic configuration of an optical pickup actuator according to the present invention.
Figure 12:
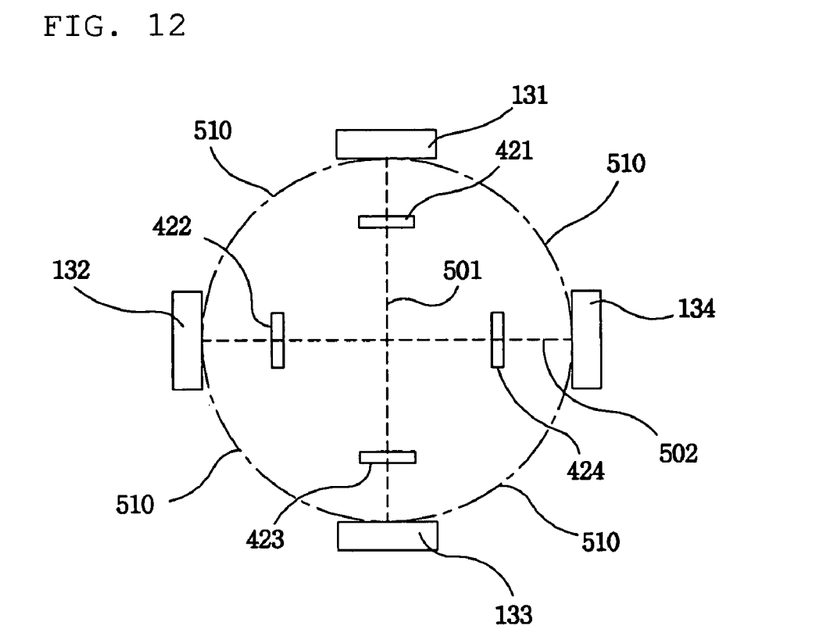
FIG. 12 is a layout of magnets provided to an optical pickup actuator according to the present invention.

FIG. 11 is a schematic layout of a basic configuration of an optical pickup actuator according to the present invention, and FIG. 12 is a layout of magnets provided to an optical pickup actuator according to the present invention for explaining positions of the magnets. As mentioned in the foregoing description, the concept of the present invention is applicable to a third equivalent disc-type recording medium as well as the CD, DVD, and BD. Hence, basic configurations will be explained with reference to the layout of FIG. 11 and conceptional diagram of FIG. 12.

Namely, an optical pickup actuator according to the present invention comprises a first and third magnets 131 and 133 confronting to leave a prescribed distance from each other wherein each of the first and third magnets 131 and 133 is divided into right and left parts differing from each other in polarity, a second and fourth magnets 132 and 134 confronting to leave a prescribed distance from each other on a line crossing with a connecting line 501 between the first and third magnets 131 and 133 wherein each of the second and fourth magnets is divided into upper and lower parts differing from each other in polarity, a pair of first conductive coils 421 and 423 provided to an inside area of a closed curve line 510 sequentially connecting the first to fourth magnets 131 to 134 to separately lie on the connecting line 501 between the first and third magnets 131 and 133, a pair of the first conductive coils 421 and 423 wound on iron pieces, respectively, a pair of second conductive coils 422 and 424 provided to the inside area of the closed curve line 510 sequentially connecting the first to fourth magnets 131 to 134 to separately lie on a connecting line 502 between the second and fourth magnets 132 and 134, a pair of the second conductive coils 422 and 424 wound on iron pieces, respectively, and a lens holder 250 having a first and second disc lenses 351 and 352 assembled thereon wherein the first and second conductive coils 422 and 424 are provided to the lens holder 250.

The first to fourth magnets are separated from each other by 90° each and the lens holder 250 is rotated by 90° centering on its center.

When voltages differing in polarity are applied to a pair of the first conductive coils 421 and 423, respectively, a tracking operation of the first disc lens 351 is carried out. When voltages differing in polarity are applied to a pair of the second conductive coils 422 and 424, respectively, a focusing operation of the first disc lens 351 is carried out.

Meanwhile, when voltages differing in polarity are applied to a pair of the first conductive coils 421 and 423, respectively after completion of rotating the lens holder 250 by 90°, a focusing operation of the second disc lens 352 is carried out. And, when voltages differing in polarity are applied to a pair of the second conductive coils 422 and 424, respectively after completion of rotating the lens holder 250 by 90°, a tracking operation of the second disc lens 352 is carried out.

Accordingly, the present invention loads a pair of lenses, e.g., BD lens and DVD lens, on one pickup to record/reproduce information on/from optical discs having various write capacities such as BD (Blu-ray disc), CD, DVD and the like, by which drive and system configurations can be simplified and by which the facilitation of the system configuration and high sensitivity of the actuator are provided since there exist no sensitivity deviations of tracking and focusing between BD and CD/DVD actuators.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical pickup actuator comprising:
   a yoke comprising a plate member and four magnet guides protruding from a lateral side of the plate member in a direction vertical to a topside of the plate member and configuring two confronting pairs with each magnet guide left a prescribed distance from adjacent magnetic guides;
   first to fourth magnets adhering closely to insides of the magnet guides, respectively to provide an inside space on the plate member of the yoke;
   a shaft protruding from the plate member of the yoke within the inside space surrounded by the first to fourth magnets;
   a lens holder loaded on the plate member of the yoke within the inside space surrounded by the first to fourth magnets to have the shaft inserted therein and to have first and second disc lenses provided thereon;
   iron piece guides protruding from a lateral side of the lens holder to confront the first to fourth magnets and to have recesses inside, respectively;
   first to fourth iron pieces fitted in the recesses of the iron piece guides, respectively; and
   coils wound on outsides of the iron piece guides, respectively.

2. The optical pickup actuator of claim 1, wherein the first disc lens is selected from the group consisting of a CD lens, a DVD lens, and a CD/DVD lens and wherein the second disc lens is a BD lens.

3. The optical pickup actuator of claim 1, wherein the first disc lens is a red light source lens and wherein the second disc lens is selected from the group consisting of a blue light source lens and a blue purple light source lens.

4. The optical pickup actuator of claim 1, wherein a shaft guide having a perforated hole inside is provided within the lens holder so that the shaft can be inserted in the perforated hole.

5. The optical pickup actuator of claim 1, wherein the first and third magnets, each of which is divided into right and left parts to differ from each other in polarity, confront each other and wherein the second and fourth magnets, each of which is divided into upper and lower parts to differ from each other in polarity, confront each other.

6. The optical pickup actuator of claim 1, wherein the lens holder is rotated by 90° centering on the shaft for switching the first and second disc lenses.

7. The optical pickup actuator of claim 1, wherein the neighboring iron pieces or magnets are separated from each other by 90°.

8. The optical pickup actuator of claim 1, wherein if voltages are applied to the coils wound on the first to fourth iron pieces, tracking or focusing of the first and second disc lenses is carried out.

9. The optical pickup actuator of claim 8, wherein the magnets or the iron pieces are uniform in size and wherein if the iron piece is placed to confront the corresponding magnet for the tracking or the focusing, a symmetric center line of the iron piece coincides with a separated line of magnet parts differing from each other in polarity by a force stabilizing the iron piece according to magnetic forces of the magnet parts.

10. The optical pickup actuator of claim 4, wherein in order for the lens holder not to rotate over 90° for the switching of the first or second disc lens, a blocking rod is provided to a lateral side of the lens holder shaft guide having the perforated hole in which the shaft of the yoke is inserted and wherein a rotation preventing block is provided to the yoke to prevent the blocking rod from being rotated over 90°.

11. The optical pickup actuator of claim 1, wherein a sidewall of the lens holder in the vicinity of the first disc lens is fully closed to recognize that the first disc lens is located at a position for performing reproduction and recording and wherein a sidewall of the lens holder in the vicinity of the second disc lens is partially open to recognize that the second disc lens is located at the position for performing the reproduction and recording.

12. The optical pickup actuator of claim 1, wherein each of the iron pieces has a shape selected from the group consisting of a square shape, a square shape having an open inside, and a cross shape.

13. An optical pickup actuator comprising:
a first and third magnets confronting to leave a prescribed distance from each other wherein each of the first and third magnets is divided into right and left parts differing from each other in polarity;
a second and fourth magnets confronting to leave a prescribed distance from each other on a line crossing with a connecting line between the first and third magnets wherein each of the second and fourth magnets is divided into upper and lower parts differing from each other in polarity;
a pair of first conductive coils provided to an inside area of a closed curve line sequentially connecting the first to fourth magnets to separately lie on the connecting line between the first and third magnets, a pair of the first conductive coils wound on iron pieces, respectively;
a pair of second conductive coils provided to the inside area of the closed curve line sequentially connecting the first to fourth magnets to separately lie on a connecting line between the second and fourth magnets, a pair of the second conductive coils wound on iron pieces, respectively; and
a lens holder having a first and second disc lenses loaded thereon wherein the first and second conductive coils are provided to the lens holder.

14. The optical pickup actuator of claim 13, wherein the first to fourth magnets are separated from each other by 90° each.

15. The optical pickup actuator of claim 13, wherein if voltages differing in polarity are applied to a pair of the first conductive coils, respectively, a tracking operation of the first disc lens is carried out.

16. The optical pickup actuator of claim 13, wherein if voltages differing in polarity are applied to a pair of the second conductive coils, respectively, a focusing operation of the first disc lens is carried out.

17. The optical pickup actuator of claim 15, wherein if voltages differing in polarity are applied to a pair of the first conductive coils, respectively after completion of rotating the lens holder by 90°, a focusing operation of the second disc lens is carried out.

18. The optical pickup actuator of claim 16, wherein if voltages differing in polarity are applied to a pair of the second conductive coils, respectively after completion of rotating the lens holder by 90°, a tracking operation of the second disc lens is carried out.

19. The optical pickup actuator of claim 13, wherein the first disc lens is selected from the group consisting of a CD lens, a DVD lens, and a CD/DVD lens and wherein the second disc lens is a BD (Blu-ray disc) lens.

* * * * *